United States Patent
Gutfleisch

(12) 
(10) Patent No.: US 6,360,663 B1
(45) Date of Patent: Mar. 26, 2002

(54) IMAGING DEVICE AND METHOD FOR FORMING AN IMAGE ON A PRINTING FORM FOR AN OFFSET PRINTING PRESS

(75) Inventor: Martin Gutfleisch, Dossenheim (DE)

(73) Assignee: Heidelberger Druckmaschinen, Heidelberg (DE)

( * ) Notice: Subject to any disclaimer, the term of this patent is extended or adjusted under 35 U.S.C. 154(b) by 0 days.

(21) Appl. No.: 09/359,179

(22) Filed: Jul. 22, 1999

(30) Foreign Application Priority Data

Jul. 22, 1998 (DE) .......................................... 198 32 918

(51) Int. Cl.$^7$ ................................................. B41C 1/10
(52) U.S. Cl. ....................................... 101/465; 101/466
(58) Field of Search ...................... 101/463.1, 465–467, 101/478; 347/111, 113, 142, 143, 159, 161, 162

(56) References Cited

U.S. PATENT DOCUMENTS

| | | | | |
|---|---|---|---|---|
| 4,036,136 A | * | 7/1977 | Takagi ......................... | 101/467 |
| 4,131,526 A | * | 12/1978 | Moeglich ..................... | 204/149 |
| 4,833,990 A | * | 5/1989 | Hirt et al. .................... | 101/467 |
| 4,958,562 A | * | 9/1990 | Lewis et al. ................. | 101/467 |
| 4,959,668 A | | 9/1990 | Hirt ............................. | 101/467 |
| 5,317,970 A | * | 6/1994 | Nussel et al. ................ | 101/467 |
| 5,472,747 A | * | 12/1995 | Poo et al. .................... | 427/536 |
| 5,555,809 A | * | 9/1996 | Hirt et al. .................... | 101/466 |

FOREIGN PATENT DOCUMENTS

DE          3311237 A1     9/1983

* cited by examiner

*Primary Examiner*—Stephen R. Funk
(74) *Attorney, Agent, or Firm*—Herbert L. Lerner; Laurence A. Greenberg; Werner H. Stemer

(57) ABSTRACT

An imaging device for forming an image on a printing form, includes an imaging head containing a multiplicity of mutually parallel conductive pins separated from one another by an insulating material, a voltage source for a high-frequency alternating voltage, and a multiplicity of electronic switches, respectively, connected at one end thereof to one of the conductive pins, and at the other end thereof to the voltage source. Also disclosed are a method of operating the imaging device, and a printing form whereon the imaging method is performed.

2 Claims, 1 Drawing Sheet

IMAGING DEVICE AND METHOD FOR FORMING AN IMAGE ON A PRINTING FORM FOR AN OFFSET PRINTING PRESS

BACKGROUND OF THE INVENTION

Field of the Invention

The invention relates to an imaging device and a method for forming an image on a printing form for an offset printing press. In this regard, a special material is used for the printing form.

The filmless production of printing forms for offset printing is increasingly expanding. For digital printing form production, an imaging unit is used that receives image data from a computer and converts this data directly into a material image on the surface of the printing form. A conventional technique for printing form imaging uses a laser that vaporizes an ink-repellent covering layer on the printing form in image regions, so that an ink-accepting layer located therebeneath accepts the printing ink.

Laser imaging units are very complicated, contain components with a limited service life and frequently require maintenance. In addition, the vaporization of the covering layer produces residues, which must be removed carefully.

SUMMARY OF THE INVENTION

It is accordingly an object of the invention to provide an imaging device and a method of forming an image of a printing form for an offset printing press which are relatively simple, utilize components which have a durable service life, require minimal maintenance, and avoid residue formation.

With the foregoing and other objects in view, there is provided, in accordance with one aspect of the invention, an imaging device for forming an image on a printing form, comprising an imaging head containing a multiplicity of mutually parallel conductive pins separated from one another by an insulating material, a voltage source for a high-frequency alternating voltage, and a multiplicity of electronic switches, respectively, connected at one end thereof to one of the conductive pins, and at the other end thereof to the voltage source.

In accordance with another feature of the invention, the conductive pins are embedded in a regular arrangement in the insulating material, the insulating material having an outer surface whereon, respectively, an end of each of the conductive pins is exposed.

In accordance with another aspect of the invention, there is provided a method of forming an image on a printing form, which comprises exposing a printing form surface formed of a polar material having properties selected from the group thereof consisting of hydrophilic and hydrophobic properties to high-frequency alternating electric fields, in regions selected from the group thereof consisting of image regions and non-image regions, the intensity, the frequency and the duration of action of the high-frequency alternating electric fields being selected so that the respectively selected hydrophilic and hydrophobic properties of the polar material of the printing form are changed in the respectively selected image regions and non-image regions.

In accordance with an additional mode of the method of the invention, the polar material is a polymer with hydrophobic properties which become hydrophilic in non-image regions due to the action of the high-frequency alternating fields.

In accordance with a concomitant aspect of the invention, there is provided a printing form for an offset printing machine having an outer surface, comprising a material forming the surface, the material having properties selected from the group thereof consisting of hydrophilic and hydrophobic properties, the material being a polar material.

The problems of the prior art are thus solved by an imaging device having an imaging or image-setting head containing a multiplicity of mutually parallel conductive pins which are separated from one another by an insulating material, a voltage source for a high-frequency alternating voltage, and a multiplicity of electronic switches, each of which is connected at one end thereof to one of the conductive pins, and at the other end thereof to the voltage source. The conductive pins are preferably embedded, in a regular arrangement, in the insulating material, which has an outer surface on which an end of each pin is exposed.

A printing form that is suitable for imaging or image setting using such an imaging head has a surface containing or consisting of a polar material having either hydrophilic or hydrophobic properties. A polar material is a material which contains polar molecules, i.e., molecules having a dipole moment even in a field-free space. In an electric field, the molecules of the polar material align themselves preferentially in the field direction. This process requires a given amount of time, which is all the longer the more viscous the surrounding medium is. In high-frequency alternating fields, therefore, the dipole setting lags behind the field. In this regard, electrical field energy is converted into heat energy, which can destroy the polar material due to the breaking apart of the bonds between the molecules. This effect is utilized, for example, for welding polar polymers such as PVC by high frequency alternating voltages.

The invention makes use of the circumstance that the decomposition of a polar material is normally also accompanied by a change in the surface properties thereof. For example, the originally hydrophobic properties of a polymer are changed to hydrophilic when it is decomposed thermally, because the surface thereof becomes rough and porous.

In the method of the invention for forming or setting an image on a printing form having a surface with the aforementioned properties, the printing form surface is exposed to high-frequency alternating electric fields either in image regions or in non-image regions thereof, the intensity, the frequency and the duration of action of the high-frequency alternating electric fields being selected so that the hydrophilic or hydrophobic properties of the polar material of the printing form are changed in the image regions or non-image regions, i.e., the properties are neutralized or even reversed with respect to the counterpart thereof. In this regard, the dot or point-like regions on the printing form surface which are converted by the alternating electric field also become more-or-less oleophobic or oleophilic, as needed for the offset printing process.

In order to perform this method with the aid of the imaging or image-setting head according to the invention, the latter is brought close to the printing form surface, and the electronic switches are switched on or off selectively, regions on the printing form which are located opposite conductive pins to which the high-frequency alternating voltage is applied being exposed to the high-frequency alternating electric field and consequently converted.

If the polar material of the printing form is a polymer that is normally hydrophobic, the non-image regions are exposed to the high-frequency alternating electric field, the surface properties in the non-image regions being changed to hydrophilic. In the case of a normally hydrophilic printing form material, the image regions would have to be converted accordingly. During a printing operation, the printing form is dampened in a conventional manner and is subsequently inked, only the image regions accepting the printing ink.

The imaging head according to the invention has a construction that is very much simpler and more rugged than a conventional laser imaging unit. Although a large number of electronic switches are needed, these are easy to mass-produce. For example, suitable switching transistors and the necessary connecting lines can be formed directly on the rear of the pin group with the aid of techniques such as have become known heretofore from semiconductor production.

Otherwise than in laser imaging, in the case of the invention, virtually no residues are produced in the form of loose particles which can impair the printing process.

The imaging head is preferably arranged opposite the printing form, either in the printing machine itself ("on-press") or outside the printing machine in a separate imaging unit ("off-press"). For "on-press" imaging, the untreated printing form or printing plate, formed of a carrier layer and a polar material applied thereto, is clamped onto a plate cylinder, and the image is formed or set by an imaging head installed in the printing machine, in order to produce a printing form that can be used for offset printing. Alternatively, a film of polar material adhesively attached to the plate cylinder, for example, can be used. For "off-press" imaging, the printing plate or film is formed or set with an image outside the printing machine by an imaging head and is then applied to the plate cylinder. During the imaging process, the distance between the printing form and the imaging head should be as small as possible, without contact therebetween. However, it is assumed that if the printing form and the imaging head make mutual contact, no damage occurs.

Alternatively, the imaging head can be integrated into the cover of a plate cylinder, the exposed ends of the pins pointing outwardly. In this case, a film of polar material that is clamped or adhesively attached to the plate cylinder is used as the printing form. It may be expedient, in this case, to use an external counterelectrode, for example a grounded metal plate, so that unconverted regions in the film which correspond to image points or non-image points reliably extend as far as the outer side of the film.

The spacing or distances between the conductive pins, and the diameter thereof, which should be made as small as technically possible, are critical for the resolution of the imaging head. In an embodiment in which only the alternating electric fields are responsible for the conversion of the printing form material, the distances between the conductive pins are limited by the fact that, with the given voltage, flashovers between the points of the pins and the printing plate do not, in fact, occur. In this way, low and medium resolutions are achievable by the invention. Higher resolutions can possibly be achieved by a further feature or development of the invention in which flashovers between the pins and the printing form are not only tolerated but are used to assist the conversion of the printing form material. The high-frequency alternating voltage used in the invention offers the advantage that it does not cause any electrode burnup, as opposed to direct voltage or low-frequency alternating voltage.

Other features which are considered as characteristic for the invention are set forth in the appended claims.

Although the invention is illustrated and described herein as embodied in an imaging device and a method for forming an image on a printing form for an offset printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
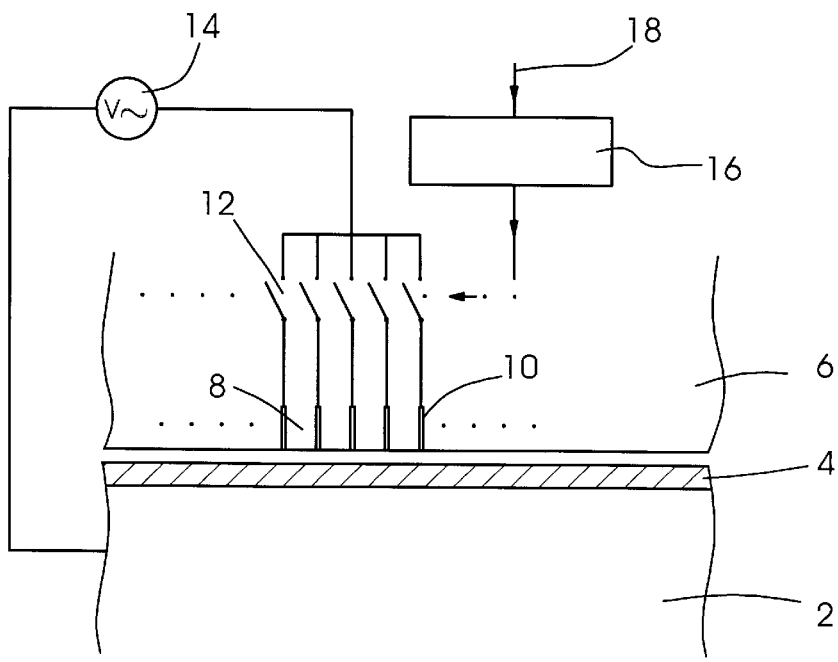
FIG. 1 is a diagrammatic and schematic sectional view of a printing form and an imaging head therefor.
Figure 2:
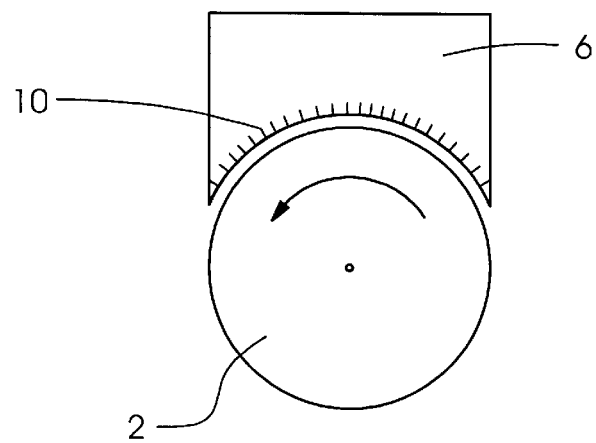
FIG. 2 is a fragmentary side elevational view of FIG. 1.

Referring now to the drawings and, first, particularly, to FIG. 1 thereof, there is shown therein part of a section taken along the length of a printing form cylinder 2, the outer cylindrical surface of which has accepted or carries a printing plate 4. The printing plate 4 is formed of a polymer such as, for example, PVC (polyvinyl chloride) or PET (polyethylene terephthalate) or of a material containing these and/or other substances. When selecting the material for the printing plate 4, care must additionally be taken that it has the lowest possible thermal conductivity. Adjacent to the printing plate 4 of the printing form cylinder 2 is an imaging head 6 that extends over the entire printing width. Transversely to the printing width, the imaging head 6 in this embodiment has a dimension corresponding to the diameter of the printing form cylinder 2, and hugs or conforms to the printing form cylinder 2, as can be seen in FIG. 2. Between the printing plate 4 of the printing form cylinder 2 and the imaging head 6, there is a small gap, so that the printing form cylinder 2 can rotate freely past the imaging head 6, as indicated in FIG. 2 by the curved arrow.

The side of the imaging head 6 facing towards the printing form cylinder 2 is formed of an insulating material 8, into which a large number of conductive terminal pins 10 have been cast, the pins 10 extending parallel to one another and perpendicular to the surface of the imaging head 6. The end of each terminal pin 10 facing towards the printing form cylinder 2 ends flush with the surface of the imaging head 6. Alternatively, the ends of the terminal pins 10 may be countersunk slightly into the imaging head 6, in order to counteract flashovers between adjacent terminal pins 10.

Figure 3:
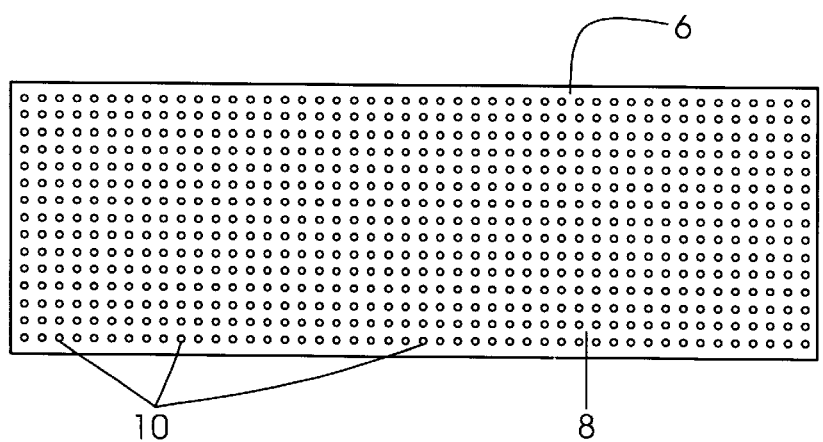
FIG. 3 is a plan view of the imaging head showing the surface thereof located opposite the printing form.

The terminal pins 10 are distributed at regular intervals along the width of the printing form cylinder 2 and also along the circumference thereof, so that they form a two-dimensional matrix. FIG. 3 shows a planar projection of the side of the imaging head 6 facing towards the printing form cylinder 2. The terminal pins 10 have a diameter in the micrometer or micron range, for example 20 $\mu$m, and the spacings therebetween are of a like order of magnitude.

The end of each terminal pin 10 that is remote from the printing form cylinder 2 is connected to a voltage source 14 via a switch 12. In practice, the switches 12 are electronic switches such as transistors, for example. The voltage source 14 produces a high-frequency alternating voltage of 500 volts and 30 MHz, for example. The switches 12 can be switched on or off individually by a drive circuit 16. The drive circuit 16 receives digital data 18 in a grid format from a non-illustrated digital pre-printing stage.

A respective partial image having a grid spacing corresponding to that provided by the terminal pins 10, and having a format corresponding to the format of the surface of the imaging head 6 facing towards the printing form cylinder 2 is employed for forming an image on the printing plate 4. The switches 12 are switched on and off according to whether or no t an image dot is to be printed at the corresponding location, and the voltage source 14 is then switched on. Terminal pins 10 which receive the high-frequency alternating voltage produce a high-frequency alternating electric field that, because of the shape of the terminal pins 10, will be more or less focussed in a direction towards the printing plate 4. Consequently, the high-frequency alternating field from a respective terminal pin 10 also then acts specifically upon an opposite point on the printing plate 4, if the gap between the imaging head 6 and the printing plate 4 is significantly greater than the distance between mutually adjacent terminal pins 10.

In this embodiment wherein the printing plate 4 is formed of a polymer such as PVC, the desired non-image locations on the printing plate 4 are exposed to the high frequency alternating electric field, specifically until the surface thereof has become rough and porous at the non-image locations so that, during the dampening operation in the subsequent printing process, the non-image locations can take up water, while the image locations are inked.

The decomposition of the printing plate 4 is due to the development of heat caused by the high-frequency alternating electric field in the plastic material. The dipoles of a polar material such as PVC attempt to align themselves in the respective field direction when they are in an alternating electric field. The more rapid the change in direction of the electric field, i.e., the higher the frequency of the field, the more difficult the setting or adjustment of the dipoles parallel to the field direction becomes, i.e., the orientation of the dipoles does not take place as rapidly as the field change. Because the dipoles are bound in the solid body, the orientation movement of the dipoles effects a conversion of the energy of the electric field into heat energy. This energy transfer thus leads to a heating of the regions exposed to the alternating electric field right up to the thermal destruction thereof due to a breaking of the bonds between the molecules.

As mentioned hereinbefore, the printing plate 4 made of PVC is written on dot by dot imagewise in negative form. A printing plate made of a different polar material, that is originally hydrophilic and becomes hydrophobic due to decomposition, would have to be written imagewise in positive form.

A non-polar material should be selected as the insulating material 8 of the imaging head 6, so that the high-frequency alternating fields do not cause any dielectric losses to occur therein which would heat the insulating material 8 excessively or even destroy it. Electrical insulating resins from the polyurethane class of substances, for example, are suitable for the insulating materials 8.

After a section on the printing plate 4 corresponding to the size of the imaging head 6 has had an image formed thereon in the manner described hereinabove, the printing form cylinder 2 is rotated slightly further and is formed with an image in accordance with the next partial image. Alternatively, the printing form cylinder 2 could rotate at constant speed during the imaging operation, the individual high-frequency alternating fields which are produced by the terminal pins 10 being caused to travel over the imaging head 6 at the same speed. The arrangement of the terminal pins 10 in the form of a two-dimensional matrix was selected in the interest of saving time during the imaging operation; if appropriate, a single row of terminal pins can also be used.

In the foregoing exemplary embodiment, the printing plate 4 has an image formed thereon in a state wherein it is clamped onto the printing form cylinder 2. Alternatively, the printing plate 4 can have an image formed thereon outside the printing machine, and an imaging head suitable for this purpose may have a different shape than the imaging head 6 described hereinbefore.

Whereas, in the foregoing exemplary embodiment, the distances between the terminal pins 10, and the voltage used were selected so that the fewest possible number of electric flashovers occur between the terminal pins 10 and the printing plate 4, in a further exemplary embodiment, it is a specific objective that flashovers take place between the corresponding terminal pins 10 and the printing plate 4, either at non-image points or at image points, the flashovers at these points ensuring additional heating. Flashovers because of high-frequency alternating voltage do not cause any burnup on the terminal pins 10, so that the imaging head 6 has an extremely long service life in this case as well.

In a further non-illustrated exemplary embodiment, the imaging head is incorporated into the jacket or shell of the printing form cylinder, by a large number of radially arranged terminal pins being machined into the cylinder jacket over an area corresponding to the maximum printing format, and are supplied selectively from the inside with high-frequency alternating voltage. A film or foil of a polar material is adhesively attached or clamped, as a printing form, onto the jacket of the printing form cylinder. The alternating electric fields have to pass completely through the printing form in this case, so as to produce a halftone image of unconverted regions on the outside of the printing form. In order to facilitate this, it is possible to arrange a stationary counterelectrode opposite the outside of the printing form, or a counterelectrode in the form of a roller that rolls thereon.

I claim:

1. A method of forming an image on a printing form, which comprises:

exposing a printing form surface formed of a polar material having properties selected from the group thereof consisting of hydrophilic and hydrophobic properties to high-frequency alternating electric fields, in regions selected from the group thereof consisting of image regions and non-image regions; and selecting the intensity, the frequency and the duration of action of the high-frequency alternating electric fields so that the respectively selected hydrophilic and hydrophobic properties of the polar material of the printing form are changed without destroying the polar material in the respectively selected image regions and non-image regions.

2. The method according to claim 1, wherein the polar material is a polymer with hydrophobic properties which become hydrophilic in non-image regions due to the action of the high-frequency alternating fields.

* * * * *